US012631395B2

(12) United States Patent
Kim et al.

(10) Patent No.: US 12,631,395 B2
(45) Date of Patent: May 19, 2026

(54) ELECTRODE DRYING DEVICE

(71) Applicant: LG Energy Solution, Ltd., Seoul (KR)

(72) Inventors: Jin Gon Kim, Daejeon (KR); Tae Won Kang, Daejeon (KR); Su Taek Jung, Daejeon (KR); Joo Young Chung, Daejeon (KR); Sangho Bae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 811 days.

(21) Appl. No.: 18/008,001

(22) PCT Filed: Jan. 24, 2022

(86) PCT No.: PCT/KR2022/001187
§ 371 (c)(1),
(2) Date: Dec. 2, 2022

(87) PCT Pub. No.: WO2022/211242
PCT Pub. Date: Oct. 6, 2022

(65) Prior Publication Data
US 2023/0304734 A1 Sep. 28, 2023

(30) Foreign Application Priority Data

Mar. 31, 2021 (KR) ........................ 10-2021-0041835
Jan. 19, 2022 (KR) ........................ 10-2022-0007660

(51) Int. Cl.
*F26B 3/04* (2006.01)
*F26B 3/20* (2006.01)
*H01M 10/04* (2006.01)

(52) U.S. Cl.
CPC .................. *F26B 3/04* (2013.01); *F26B 3/20* (2013.01); *H01M 10/0409* (2013.01)

(58) Field of Classification Search
CPC .......... F26B 3/04; F26B 3/20; H01M 10/0409
USPC ............................................................ 34/90
See application file for complete search history.

(56) References Cited

U.S. PATENT DOCUMENTS

| | | | | |
|---|---|---|---|---|
| 5,651,193 | A * | 7/1997 | Rhodes | F26B 25/009 |
| | | | | 34/535 |
| 8,196,312 | B2 * | 6/2012 | Taguchi | F26B 13/10 |
| | | | | 159/7 |
| 10,199,635 | B2 * | 2/2019 | Ho | F26B 21/14 |
| 10,403,880 | B2 * | 9/2019 | Ahmad | H01M 4/1391 |

(Continued)

FOREIGN PATENT DOCUMENTS

| | | |
|---|---|---|
| CN | 202393179 U | 8/2012 |
| CN | 203704556 U | 7/2014 |

(Continued)

OTHER PUBLICATIONS

International Search Report for PCT/KR2022/001187 mailed May 9, 2022. 3 pgs.

(Continued)

*Primary Examiner* — Stephen M Gravini
(74) *Attorney, Agent, or Firm* — Lerner David LLP

(57) ABSTRACT

The electrode drying device for drying moisture in electrodes includes a chamber section; a stacking section in which at least one electrode is configured to be arranged separately from each other; a first heater unit located adjacent to the stacking section; and a circulation unit for circulating heat inside the chamber section.

15 Claims, 3 Drawing Sheets

(a)

(b)

(56) References Cited

U.S. PATENT DOCUMENTS

| | | | | |
|---|---|---|---|---|
| 11,313,621 | B2 * | 4/2022 | Fredric | F26B 25/22 |
| 11,384,980 | B2 * | 7/2022 | Triglia, Jr. | F26B 13/008 |
| 11,482,751 | B2 * | 10/2022 | Lee | H01M 50/211 |
| 11,713,924 | B2 * | 8/2023 | Zielinski | F26B 23/04 34/92 |
| 11,870,094 | B2 * | 1/2024 | Shin | H01M 50/367 |
| 12,013,181 | B2 * | 6/2024 | Nakano | F26B 15/18 |
| 12,281,847 | B2 * | 4/2025 | Zielinski | F26B 3/20 |
| 12,449,197 | B1 * | 10/2025 | Parle | F26B 25/003 |
| 2018/0226700 | A1 | 8/2018 | Kim et al. | |
| 2022/0263058 | A1 | 8/2022 | Woo et al. | |
| 2023/0304734 | A1 * | 9/2023 | Kim | F26B 9/06 |

FOREIGN PATENT DOCUMENTS

| | | | |
|---|---|---|---|
| CN | 204130628 U | 1/2015 | |
| CN | 106091609 A | 11/2016 | |
| CN | 206593395 U | 10/2017 | |
| CN | 207180200 U | 4/2018 | |
| CN | 108240748 A | 7/2018 | |
| CN | 108731392 A | 11/2018 | |
| CN | 109099654 A | 12/2018 | |
| CN | 209558796 U | 10/2019 | |
| CN | 210267939 U | 4/2020 | |
| CN | 210625152 U | 5/2020 | |
| CN | 211012183 U | 7/2020 | |
| CN | 211823523 U | 10/2020 | |
| CN | 212109304 U | 12/2020 | |
| CN | 116391268 A * | 7/2023 | F26B 3/04 |
| EP | 3846267 A1 | 7/2021 | |
| EP | 4135064 A1 * | 2/2023 | F26B 25/18 |
| KR | 101077069 B1 | 10/2011 | |
| KR | 20170059273 A | 5/2017 | |
| KR | 101800715 B1 | 11/2017 | |
| KR | 101965415 B1 | 4/2019 | |
| KR | 20200058315 A | 5/2020 | |
| WO | WO-2022211242 A1 * | 10/2022 | F26B 25/18 |

OTHER PUBLICATIONS

Communication pursuant to Article 94(3) EPC for European Application No. 22781363.1, dated Feb. 25, 2025, 2 pages.

Extended European Search Report including Written Opinion for Application No. 22781363.1 dated Oct. 24, 2023, pp. 1-7.

* cited by examiner

【FIG. 1】
1000
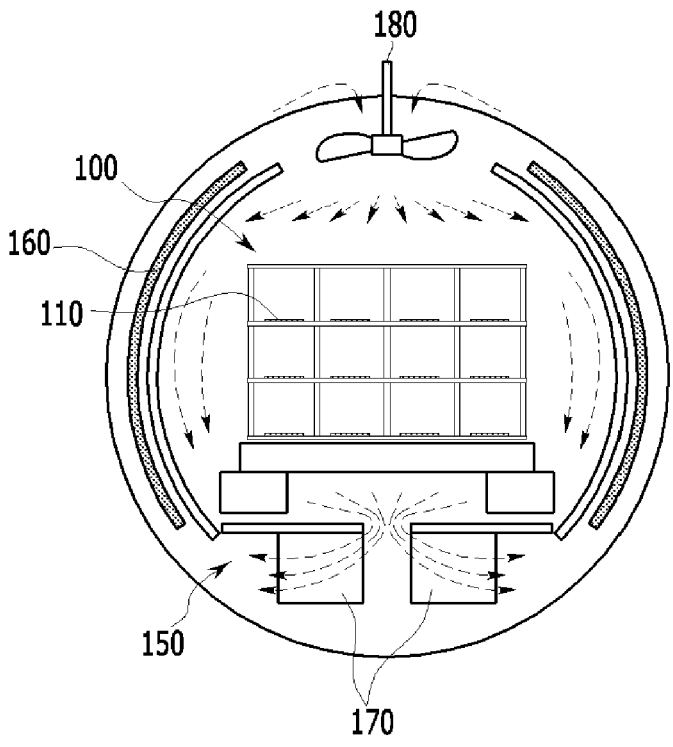
【FIG. 2】
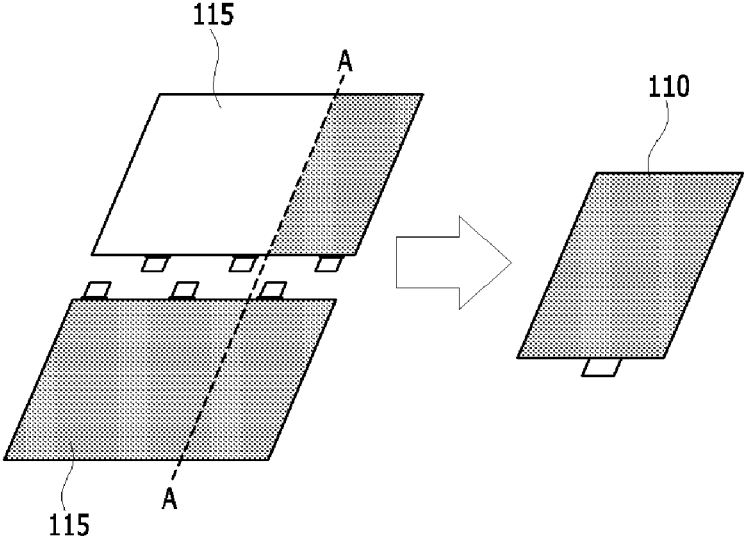

【FIG. 3】
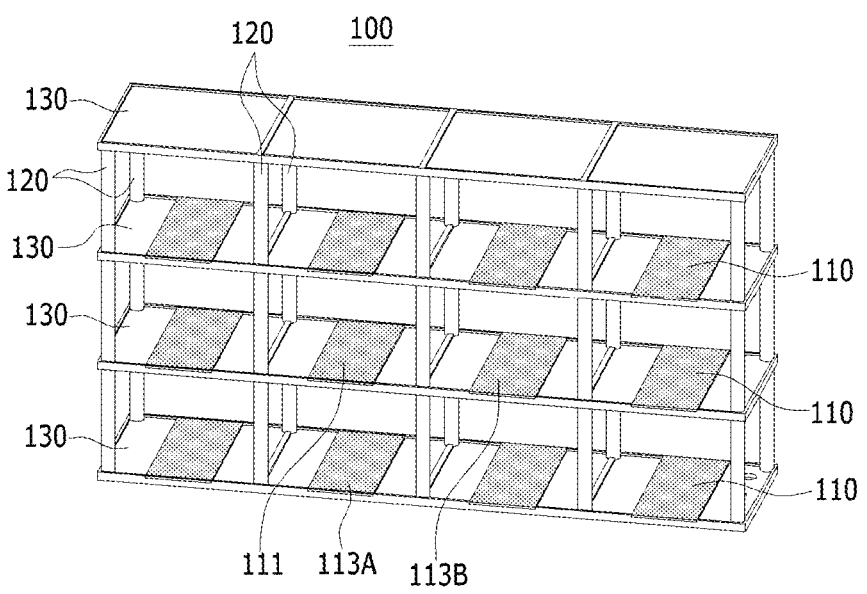
【FIG. 4】
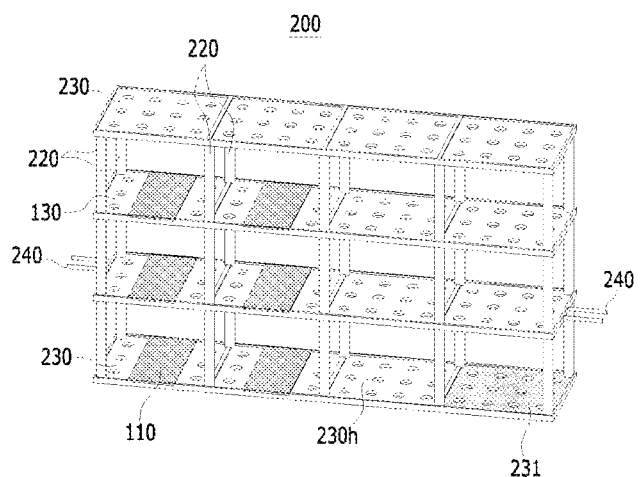

ELECTRODE DRYING DEVICE

CROSS-REFERENCE TO RELATED APPLICATIONS

The present application is a national phase entry under 35 U.S.C. § 371 of the International Application No. PCT/KR2022/001187 filed on Jan. 24, 2022, which claims priority from Korean Patent Application No. 10-2021-0041835 filed on Mar. 31, 2021 and Korean Patent Application No. 10-2022-0007660 filed on Jan. 19, 2022, all of which are incorporated herein by reference in their entireties.

FIELD OF THE INVENTION

The present disclosure relates to an electrode drying device, and more particularly, to an electrode drying device that dries electrodes in a battery manufacturing process, wherein the electrode drying device dries residual moisture inside the electrode.

BACKGROUND OF THE INVENTION

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

The secondary battery may be classified based on the shape of a battery case into a cylindrical battery having an electrode assembly mounted in a cylindrical metal can, a prismatic battery having an electrode assembly mounted in a prismatic metal can, and a pouch type battery having an electrode assembly mounted in a pouch-shaped case made of a laminated aluminum sheet.

Further, the secondary battery can be formed by inserting an electrode assembly composed of a positive electrode, a negative electrode, and a separator into a case, and then sealing the case. The electrode assembly can be formed by interposing a separator between the positive electrode and the negative electrode, and winding them in a jelly-roll type many times or laminating them in a plurality of layers.

On the other hand, the secondary battery performs a process of drying the electrode when manufacturing an electrode such as a positive electrode or a negative electrode. In particular, the electrode is subjected to a drying process in a vacuum state, but there is a problem in that moisture deviation in the electrode occurs depending on the shape and position of the electrode. Therefore, there is a need to develop an electrode drying device capable of minimizing the moisture deviation inside the electrode in a drying process.

BRIEF SUMMARY OF THE INVENTION

It is an object of the present disclosure to provide an electrode drying device that dries electrodes in a battery manufacturing process, wherein the electrode drying device dries residual moisture inside the electrode.

The objects of the present disclosure are not limited to the aforementioned objects, and other objects which are not described herein should be clearly understood by those skilled in the art from the following detailed description and the accompanying drawings.

According to one embodiment of the present disclosure, there is provided an electrode drying device comprising: a chamber section; a stacking section including at least one electrode; a first heater unit located adjacent to the stacking section; and a circulation unit for circulating heat inside the chamber section.

The stacking section includes a pair of plates facing each other, and a support part located at a corner of the plate and extending in a direction perpendicular to one surface of the plate, wherein the pair of plates may be connected to each other by the support part.

The stacking section includes a first stacking section and a second stacking section in which the electrodes different from each other are respectively arranged, and the first stacking section and the second stacking section may be arranged in a vertical direction or a horizontal direction.

The first stacking section and the second stacking section are arranged in a vertical direction, and among the pair of plates included in the first stacking section, a plate adjacent to the second stacking section may be included in the second stacking section.

The first stacking section and the second stacking section are arranged in a horizontal direction, and among the support part included in the first stacking section, the support part located at each corner of an end part adjacent to the second stacking section may be included in the second stacking section.

At least one hole may be formed in each of the plates.

The electrode may be located on the hole formed in the plate.

The hole in the plate may be formed in a portion in contact with the electrode.

The plate may be made of a heat conductive material.

The plate may be a heat conductive sheet.

The plate further may include at least one heating channel.

The heating channel may be formed so as to extend from one side surface of the plate toward the other side surface.

The heating channel may be connected with the first heater unit.

The first heater unit may be located adjacent to the side surface of the stacking section, and the circulation unit may be located on the stacking section.

The electrode drying device further includes comprises a second heater part located at the lower part of the stacking section, and the heater unit may be housed in the chamber section.

According to embodiments, the electrode drying device of the present disclosure includes a stacking section in which at least one electrode is arranged separately from each other, thereby capable of improving drying performance for each electrode.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a cross-sectional view of an electrode drying device according to an embodiment of the present disclosure;

FIG. 2 is a diagram showing an electrode arranged in the electrode drying device of FIG. 1;

FIG. 3 is a diagram showing a stacking section included in the electrode drying device of FIG. 1;

FIG. 4 is a diagram showing a stacking section according to another embodiment of the present disclosure.

DETAILED DESCRIPTION OF THE EMBODIMENTS

Figure 5:
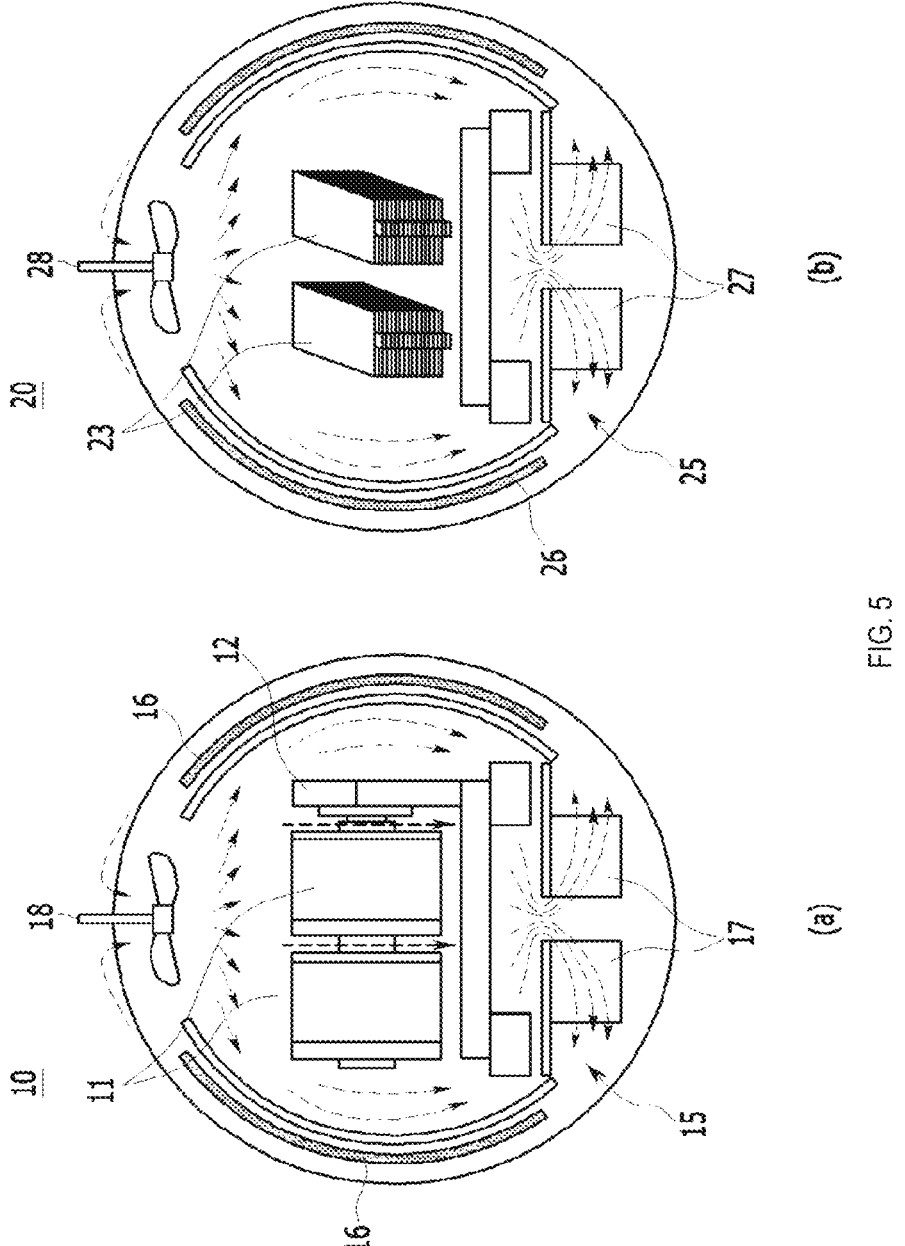
FIG. 5 is a cross-sectional view of an electrode drying device according to a comparative example.

Hereinafter, various embodiments of the present disclosure will be described in detail with reference to the accompanying drawings so that those skilled in the art can easily carry out them. The present disclosure may be carried out in various different forms other than those described below, and the scope of the present disclosure is not limited by the embodiments described herein.

Portions that are irrelevant to the description will be omitted to clearly describe the present disclosure, and like reference numerals designate like elements throughout the description.

Further, in the drawings, the size and thickness of each element are arbitrarily illustrated for convenience of explanation, and the present disclosure is not necessarily limited to those illustrated in the drawings. In the drawings, the thickness of layers, regions, etc. are exaggerated for clarity. In the drawings, for convenience of explanation, the thicknesses of some layers and regions are exaggerated.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a cross-sectional view of an electrode drying device according to an embodiment of the present disclosure. FIG. 2 is a diagram showing an electrode arranged in the electrode drying device of FIG. 1.

Referring to FIG. 1, the electrode drying device 1000 according to an embodiment of the present disclosure includes a chamber section 150; a stacking section 100 including at least one electrode 110; a first heater unit 160 located adjacent to the stacking section 100; and a circulation unit 180 that circulates heat inside the chamber section 150; and a chamber section 150 in which the stacking section 100, the first heater unit 160 and the circulation unit 180 are housed.

Here, the chamber section 150 may be a space maintained in a vacuum state. The vacuum state mentioned herein may mean a state of an environment lower than the atmospheric pressure. Thereby, in the electrode drying device 1000 according to the present embodiment, the drying process for the electrode 110 is performed in the chamber section 150, so that the drying performance is excellent compared to that in the atmospheric pressure environment, and additionally, bubbles inside the electrode 110 can also be removed.

In one an example, referring to FIGS. 1 and 2, the electrode 110 can be manufactured by being cut or notched from the electrode sheet 115 based on the cutting line A-A. Here, the electrode 110 may correspond to a positive electrode or a negative electrode. That is, the electrode sheet 115 may also correspond to a positive electrode sheet or a negative electrode sheet. However, the method of manufacturing the electrode 110 is not limited thereto, and may include manufacturing in the form of an individual electrode rather than the electrode sheet 115.

Further, the electrodes 110 may be individually arranged on the stacking section 100 using a separate robot or a gripper. However, the device for stacking the electrode 110 on the stacking section 100 is not limited thereto, and any device that can be easily arranged on the stacking section 100 without giving damage to the electrode 110 is included in the present embodiment.

Further, the first heater unit 160 can be located adjacent to the stacking section 100. In one example, the first heater unit 160 can be located adjacent to the side surface of the stacking section 100. More specifically, as shown in FIG. 1, the first heater unit 160 can be located in the form of surrounding the side surface of the stacking section 100. However, the position of the first heater unit 160 is not limited thereto, and any position capable of removing moisture from the electrode 110 arranged on the stacking section 100 can be included in the present embodiment.

Further, the first heater unit 160 may have a curved shape as shown in FIG. 1. More specifically, the first heater unit 160 is extended along the side surface of the stacking section 100, but may be extended in a curved shape. However, the shape of the first heater unit 160 is not limited thereto, and any shape capable of removing moisture from the electrode 110 arranged on the stacking section 100 can be included in the present embodiment.

Further, the electrode drying device 1000 according to the present embodiment may further include a second heater unit 170. Here, the second heater unit 170 may be housed in the chamber section 150 together with other components. More specifically, as shown in FIG. 1, the second heater unit 170 may be located at the lower part of the stacking section 100.

Here, the first heater unit 160 and the second heater unit 170 mentioned herein may be heaters that can be generally used for drying the electrode 110. In one example, each of the first heater unit 160 and the second heater unit 170 may be a far-infrared (FIR) heater, a mid-infrared (MIR) heater, or a near-infrared (NIR) heater. However, the present disclosure is not limited thereto, and any device capable of removing moisture from the electrode 110 arranged on the stacking section 100 can be included in the present embodiment.

Therefore, according to the above configuration, the electrode drying device 1000 according to the present embodiment includes the first heater unit 160 and/or the second heater unit 170 surrounding the stacking section 100, so that moisture inside the electrode 110 arranged in the stacking section 100 can be effectively removed.

Further, the circulation unit 180 may circulate heat inside the chamber section 150. More specifically, as shown in FIG. 1, the circulation unit 180 may be located on the stacking section 100. In particular, heat inside the chamber section 150 can be generated by the first heater unit 160 and/or the second heater unit 170, and convection may occur in which heat inside the chamber section 150 transfers within the chamber section 150 by the circulation unit 180.

In one example, the circulation unit 180 may be a circulation fan (FAN). However, a device that can be used as the circulation unit 180 is not limited thereto, and any device capable of circulating heat inside the chamber section 150 can be included in the present embodiment.

Thereby, according to the above configuration, the electrode drying device 1000 of the present embodiment has a feature that heat inside the chamber section 150 is moved by the circulation unit 180, and moisture in the electrode 110 can be relatively uniformly removed regardless of the position of the electrode 110 arranged on the stacking section 100.

FIG. 3 is a diagram showing a stacking section included in the electrode drying device of FIG. 1.

Referring to FIGS. 1 and 3, the stacking section 100 may include a plate 130 on which the electrode 110 is arranged, and a support part 120 that is located at the corner of the plate 130 and extends in a direction perpendicular to one surface of the plate 130. The stacking section 100 may include a pair of plates 130 facing each other, and the pair of plates 130 may be connected to each other by the support part 120. Among the pair of plates 130 included in the stacking section 100, the plate 130 located at the relatively upper side may be referred to as an upper plate, and the plate 130 located at the lower side may be referred to as a lower plate. In this case, the electrode 110 may be arranged on the lower plate.

More specifically, as shown in FIGS. 1 and 3, the plate 130 may have a size in which one electrode 110 can be arranged. In one example, the plate 130 may have a size equal to or larger than that of the electrode 110. However, the size of the plate 130 is not limited thereto, and may have a size in which at least two electrodes 110 can be arranged. In this case, the at least two electrodes 110 may be arranged separately from each other on the plate 130.

Here, the plate 130 may be made of a material such as steel. However, the present disclosure is not limited thereto, and any material having excellent durability can be included in the plate 130 of the present embodiment.

Further, the stacking section 100 may include a first stacking section and a second stacking section in which the electrodes 110 different from each other are respectively arranged. The first stacking section and the second stacking section can be arranged in a vertical direction or a horizontal direction. Here, the number of the first stacking section and the second stacking section included in the stacking section 100 can be adjusted as needed.

The stacking section 100 may include a first stacking section in which the first electrode 111 is arranged and a second stacking section in which the second electrodes 113A and 113B are arranged. Here, the first electrode 111 may be any electrode 110 arranged on the stacking section 100, and the second electrodes 113A and 113B may be electrodes 110 different from first electrode 111. The first electrode 111 and the second electrodes 113A and 113B can be arranged in a vertical direction or a horizontal direction. Here, the two members being arranged in the vertical direction may mean that one member is arranged on the upper side or the lower side of the other member. Further, the two members being arranged in the horizontal direction may mean that one member is arranged in front, rear, left, right and right sides of the other member.

More specifically, in the stacking section 100, when the first stacking section and the second stacking section are arranged in a vertical direction, the plate 130 adjacent to the first stacking section among the pair of plates 130 included in the second stacking section may be a plate 130 adjacent to the second stacking section among the pair of plates 130 included in the first stacking section. In other words, as shown in FIGS. 1 and 3, when the first stacking section and the second stacking section are arranged in a vertical direction, the first stacking section and the second stacking section may include one plate 130 together. The first stacking section and the second stacking section may share one plate 130. Among the pair of plates 130 included in the first stacking section, a plate 130 adjacent to the second stacking section may be included in the second stacking section.

In other words, as illustrated in FIG. 3, the stacking section 100 may include a first stacking section in which the first electrode 111 is arranged and a second stacking section in which the second electrode 113A is arranged. The first electrode 111 and the second electrode 113A may be arranged in a vertical direction. The first electrode 111 and the second electrode 113A may be arranged so as to face each other. One surface of the first electrode 111 and one surface of the second electrode 113A may be arranged so as to face each other. The first electrode 111 may be arranged on the lower plate of the first stacking section, and the second electrode 113A may be arranged on a lower plate of the second stacking section. The first stacking section may be located on the upper side of the second stacking section, wherein the lower plate of the first stacking section may be an upper plate of the second stacking section. Here, unlike the one illustrated, the first stacking section may be located on the lower side of the second stacking section, wherein the upper plate of the first stacking section may be a lower plate of the second stacking section.

More specifically, in the stacking section 100, when the first stacking section and the second stacking section are arranged in a horizontal direction, one end part of the pair of plates 130 included in the first stacking section and one end part of the pair of plates 130 included in the second stacking section may be in contact with each other. In one example, one end part of the pair of plates 130 included in the first stacking section and one end part of the pair of plates 130 included in the second stacking section can be fixed to each other by a fixing method such as weld-joining. In another example, one end part of the pair of plates 130 included in the first stacking section and one end part of the pair of plates 130 included in the second stacking section can be manufactured by being integrated with each other.

Additionally, both ends of the support part 120 may be in contact with the corners of the pair of plates 130 in a direction perpendicular to each other. In one example, both ends of the support part 120 may be fixed to the corners of the pair of plates 130 by weld-joining or the like. In another example, a separate hole (not shown) is formed in the corners of the pair of plates 130, and both ends of the support part 120 can be fixed by fitting in the hole. However, the fixing method between both ends of the support unit 120 and the plate 130 is not limited thereto, and other commonly used fixing methods are applicable.

Further, in the stacking section 100, when the first stacking section and the second stacking section are arranged in a horizontal direction, the support part 120 adjacent to the second stacking section among the support parts 120 included in the first stacking section may be a support part 120 adjacent to the first stacking section among the support parts 120 included in the second stacking section. In other words, as shown in FIGS. 1 and 3, when the first stacking section and the second stacking section are arranged in a horizontal direction, the first stacking section and the second stacking section may include a support part 120 located at each corner of an end part in contact with each other. The first stacking section and the second stacking section may share the support part 120 located at each corner of the end parts adjacent to each other. Among the support parts 120 included in the first stacking section, the support parts 120 located at each corner of an end adjacent to the second stacking section can be included in the second stacking section.

In other words, as illustrated in FIG. 3, the stacking section 100 may include a first stacking section in which the first electrode 111 is arranged and a second stacking section in which the second electrode 113B is arranged. The first electrode 111 and the second electrode 113B may be arranged in a horizontal direction. The first electrode 111 and the second electrode 113B may be arranged side by side. The first electrode 111 and the second electrode 113B may be arranged on the same plane. The first electrode 111 may be arranged on the lower plate of the first stacking section, and the second electrode 113B may be arranged on a lower plate of the second stacking section. The lower plate of the first stacking section and the lower plate of the second stacking section may be arranged side by side. The lower plate of the first stacking section and the lower plate of the second stacking section may be arranged on the same plane. The first stacking section may be located on one side of the second stacking section, and one end part of the first stacking section and one end part of the second stacking section may be located adjacent to each other. At this time, the support part 120 located at each corner of the end part adjacent to the second stacking section of the support part 120 of the first stacking section may be a support part 120 located at each corner of an end part adjacent to the first stacking section among the support unit 120 of the second stacking section.

Thereby, according to the above configuration, the electrode drying device 1000 of the present embodiment has a feature that the pair of plates 130 may be separated from each other by the support part 120, and the electrodes 110 arranged on each plate 130 may also be separated from each other by the length of the support part 120. That is, the upper surface of the electrode 110 disposed on the plate 130 may be exposed in the chamber section 150, so that the drying performance of the electrode 110 by heat inside the chamber section 150 can be improved.

Next, the stacking section 200 according to another embodiment of the present disclosure will be described. However, in the following, the portions different from the stacking section 100 which is the above-mentioned embodiment will be mainly described, and portions that can be described similarly to the stacking section 100 which is the above-mentioned embodiment will be omitted.

FIG. 4 is a diagram showing a stacking section according to another embodiment of the present disclosure.

Referring to FIG. 4, the stacking section 200 may be formed with at least one hole 230h in each of the plates 230. More specifically, the at least one hole 230h may be formed on the plate 230 so as to have a predetermined interval or a predetermined pattern.

Further, the hole 230h in the plate 230 may be formed in consideration of the position where the electrode 110 is arranged. In one example, the hole 230h in the plate 230 may be formed in a portion in contact with the electrode 110. In other words, as shown in FIG. 4, the electrode 110 may be located on a hole 230h formed in the plate 230.

Thereby, in the electrode drying device 1000 according to the present embodiment, a surface in contact with the plate 230 among the outer surfaces of the electrode 110 can be in contact with the hole 230h, so that heat inside the chamber section 50 can be easily transferred to a surface of the outer surface of the electrode 110 in contact with the plate 230. That is, the drying performance of the electrode 110 due to the heat inside the chamber section 150 may be further improved even on the surface in contact with the plate 230 among the outer surface of the electrode 110.

Further, according to another embodiment of the present disclosure, the plate 230 may be a heat conductive plate 231 made of a heat conductive material. For example, the heat conductive plate 231 may be a sheet made of a heat conductive material. In this case, the heat conductive plate 231 may be a sheet made of a silicon (Si) material. However, the present disclosure is not limited thereto, and any material having excellent heat conductivity and durability may be included in the heat conductive plate 231 of the present embodiment. In another example, the heat conductive plate 231 may be coated with a heat conductive material on the plate 230.

Therefore, in the electrode drying device 1000 according to the present embodiment, the surface in contact with the plate 230 among the outer surfaces of the electrode 110 can be dried even by heat conduction caused by the heat conductive material included in the heat conductive plate 231. That is, the drying performance of the electrode 110 with respect to a surface in contact with the heat conductive plate 231 among the outer surface of the electrode 110 can be further improved.

Further, the heat conductive plate 231 may be included by replacing the plate 230 depending on the position of the stacking section 200. In other words, depending on the position of the stacking section 200, there may be a position where the heat inside the chamber section 150 is transferred to be relatively low, and the plate 230 of the stacking section 200 that is at this position can be replaced with a heat conductive plate 231.

Thereby, in the electrode drying device 1000 according to the present embodiment, it is possible to reduce the variation in drying performance depending on the position of the stacking section 200.

According to yet another embodiment of the present disclosure, the plate 230 may further include at least one heating channel 240. More specifically, the heating channel 240 may be formed so as to extend from one side surface of the plate 230 toward the other side surface. The heating channel 240 may be connected to other components. In one example, the heating channel 240 may be connected to the first heater unit 160. In another example, the heating channel 240 may be connected to a heater unit separate from the first heater unit 160 and/or the second heater unit 170.

Thereby, in the electrode drying device 1000 according to the present embodiment, the surface in contact with the plate 230 among the outer surfaces of the electrode 110 can be dried even by heat conduction caused by the heating channel 240 included in the plate 230. That is, the drying performance of the electrode 110 with respect to the surface in contact with the plate 230 among the outer surfaces of the electrode 110 can be further improved.

FIG. 5 is a cross-sectional view of an electrode drying device according to a comparative example.

Referring to FIG. 5, FIG. 5(a) shows an electrode drying device 10 in which the electrode sheet 11 is in an electrode roll state according to Comparative Example 1. FIG. 5(b) shows an electrode drying device 20 in the case of a magazine type, which is an electrode stack 23 in which a plurality of electrodes are stacked according to Comparative Example 2.

Referring to FIG. 5(a), in the electrode drying device 10 according to Comparative Example 1, the electrode sheet 11 is dried in an electrode roll state, which causes a problem that moisture deviation occurs between the electrode sheet 11 portion located at the outer shell and the electrode sheet 11 portion located at the central portion.

Referring to FIG. 5(b), in the electrode drying device 20 according to Comparative Example 2, drying is performed on the electrode stack 23 on which a plurality of electrodes are stacked, which causes a problem that moisture deviation occurs depending on the position (upper portion, central portion, or lower portion) of the electrode included in the electrode stack 23.

In contrast, referring to FIGS. 1 to 4, in the electrode drying device 1000 according to the present embodiment, each electrode 110 is individually arranged on the stacking section 100, so that the moisture deviation between the electrodes 110 can be minimized, and thus the drying performance of the electrodes 110 can also be further improved.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS 100, 200: stacking section
110: electrode
150: chamber section
160: first heater unit
170: second heater unit
180: circulation unit
1000: electrode drying device

The invention claimed is:

1. An electrode drying device comprising:
a chamber section;
a stacking section including at least one electrode;
a first heater unit located in the chamber section adjacent to the stacking section; and
a circulation unit for circulating heat inside the chamber section.

2. The electrode drying device of claim 1, wherein:
the stacking section comprises a pair of plates facing each other and configured to receive the at least one electrode thereupon, and a support part located at a corner of one of the plates and extending in a direction perpendicular to one surface of the one of the plates, wherein the pair of plates are connected to each other by the support part.

3. The electrode drying device of claim 2, wherein:
the stacking section comprises a first stacking section and a second stacking section in which a first one of the at least one electrode and a second of the at least one electrode different from each other are respectively configured to be arranged, and
the first stacking section and the second stacking section are arranged in a vertical direction or a horizontal direction.

4. The electrode drying device of claim 3, wherein:
the first stacking section and the second stacking section are arranged in a vertical direction, and
among the pair of plates included in the first stacking section, a plate adjacent to the second stacking section is included in the second stacking section.

5. The electrode drying device of claim 3, wherein:
the first stacking section and the second stacking section are arranged in a horizontal direction, and
among the support part included in the first stacking section, the support part located at each corner of an end part adjacent to the second stacking section is included in the second stacking section.

6. The electrode drying device of claim 2, wherein:
at least one hole is formed in each of the pair of plates.

7. The electrode drying device of claim 6, wherein:
the at least one electrode is located on the hole formed in the corresponding one of the pair of plates.

8. The electrode drying device of claim 6, wherein:
the at least one hole in one of the pair of plates is formed in a portion configured to be in contact with the at least one electrode.

9. The electrode drying device of claim 2, wherein:
the plates are made of a heat conductive material.

10. The electrode drying device of claim 9, wherein:
the plates are heat conductive sheets.

11. The electrode drying device of claim 2, wherein:
the plates further comprise at least one heating channel.

12. The electrode drying device of claim 11, wherein:
the heating channel is formed so as to extend from one side surface of one of the plates toward another side surface.

13. The electrode drying device of claim 12, wherein:
the heating channel is connected with the first heater unit.

14. The electrode drying device of claim 1, wherein:
the first heater unit is located adjacent to a side surface of the stacking section, and
the circulation unit is located on the stacking section.

15. The electrode drying device of claim 14, further comprising a second heater part located at a lower part of the stacking section.

* * * * *